United States Patent Office 2,892,766
Patented June 30, 1959

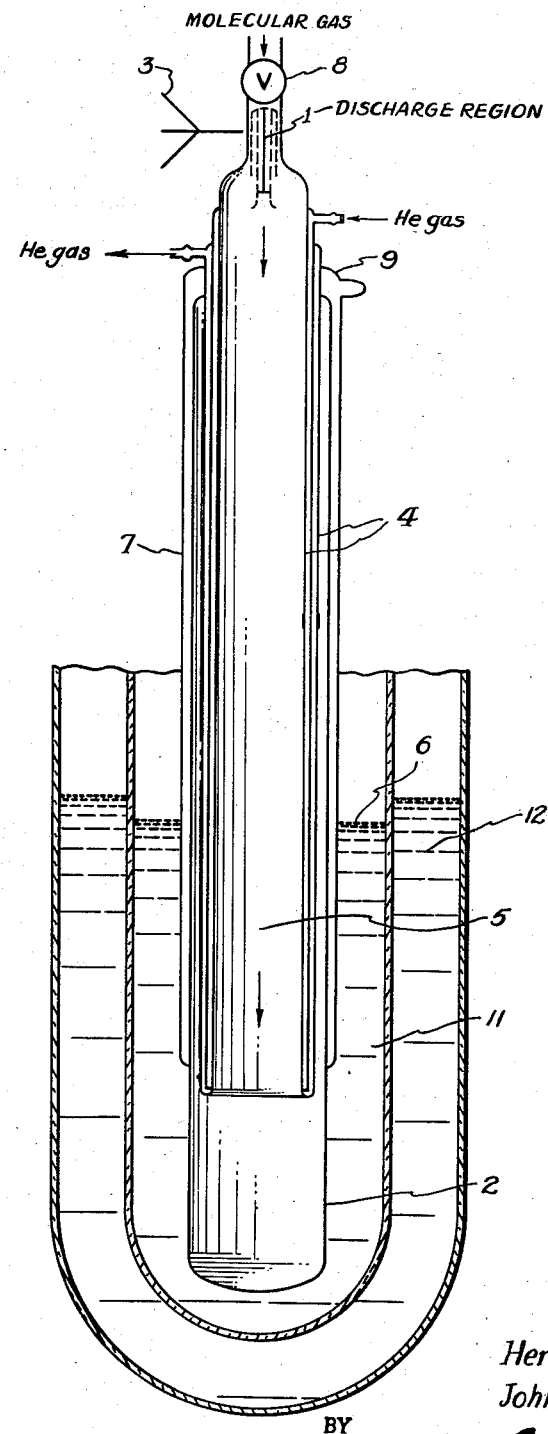
INVENTOR
Herbert P. Broida
John R. Pellam

2,892,766

FORMATION AND STABILIZATION OF ATOMS AND FREE RADICALS

Herbert P. Broida, Bethesda, Md., and John R. Pellam, Pasadena, Calif., assignors to the United States of America as represented by the Secretary of Commerce Application January 28, 1955, Serial No. 484,860

10 Claims. (Cl. 204—164)

This invention relates to means for obtaining atoms and radicals, and more particularly, to means for utilizing extremely low temperatures to "freeze out" in a solid form such atoms and radicals from the products of an electrical discharge through molecular gases.

It is well known that atoms and short-lived molecules such as O, H, N, and OH, can be pumped from an electrical discharge region in concentrations of several percent. These concentrations appear when certain gases containing large amounts of any of the above-mentioned group are passed through an electrodeless electrical discharge. Heretofore the products so produced have been highly unstable and remain uncombined for only a short time.

However, there appears to be no record in the prior art of any work which resulted in the production of atoms and radicals of elements in a permanent uncombined solid state.

The present invention provides means and a method for obtaining solid atomic elements as well as solid free radicals. Molecular gases are passed through an electrical discharge and the products subsequently subjected to extremely low temperatures. The result is a substantial deposit of a solid concentration of an atomic form of the element or material or a solid concentration of free radicals.

An object of this invention is to provide an improved method and means for obtaining uncombined atomic elements.

Another object of this invention is to provide an improved method and means for obtaining free radicals.

A further object of this invention is to provide a method and means for obtaining solid atomic elements and free radicals.

An additional object of this invention is to provide uncombined atomic elements and free radicals which may be stored for relatively long periods of time.

Another object of this invention is to provide improved means for producing chemical reactions.

A final object of this invention is to provide means for producing new types of chemical reactions.

The present invention operates on the principle of a high vacuum pump. Molecular gases such as $N_2$, $O_2$, $H_2$ and/or $H_2O$ at pressures ranging from 0.1 to 10 mm. are passed through a high frequency electrodeless electrical discharge of the order of 2450 mc./sec. The products from the discharge are then rapidly pumped into a trap at liquid helium temperature and the resulting solids are collected in the trap. Due to the fact that any element except helium is in a solid form at the trap temperature, a near perfect vacuum is formed in the trap causing the gaseous discharge products to pass rapidly from the discharge region into the trap. The solids subsequently formed by these products are allowed to gradually warm up and observations of various identifying phenomena can be carefully made.

The single figure of the drawing illustrates the apparatus used in connection with the present invention.

In the embodiment shown a molecular gas containing large amounts of one or more of the atoms or radicals to be frozen out is introduced through a control stopcock 8 from a source of molecular gas such as a commercial gas cylinder and traverses a discharge region 1 at a low pressure of the order of 0.1 to 10 mm. Hg. The discharge in discharge region 1 is excited by means of a microwave (2450 mc./sec.) voltage induced by antenna 3 which in turn is supplied from any suitable high frequency source (not shown). The single-wall lower extremity 2 immersed in liquid helium 11 acts as a trap by freezing out all gases other than helium and thus constitutes in effect a high-speed vacuum pump for maintaining the flow of gas. In order to prevent solidification of discharge products at temperatures above 4.2° K. (the liquefaction temperature of helium) the flow is carried to the lower portions of the apparatus within a passageway kept nearly at room temperature. This relatively high temperature is maintained by forcing helium gas at room temperature between compound walls 4 surrounding the channel 5 through which the discharge products pass. Since these walls make solid contact with the remainder of the system only at the upper (room temperature) extremity, as shown at 9, the introduction of such a "sheath" of warm gas extending considerably below the liquid helium level 6 causes but a slight heat input. By this means, however, the products of the discharge pass abruptly from room temperature to the collecting vessel 2 at low temperature and accumulate in solid form upon contact with the walls of vessel 2. A vacuum region 7 surrounds the entire assembly above chamber 2.

The liquid helium bath 11 may be insulated from the outside temperature by an additional bath of liquid nitrogen 12 to reduce the amount of liquid helium required to maintain vessel 2 at a very low temperature.

The following observed phenomena summarizes the results obtained utilizing various gases with the apparatus of the present invention.

(a) *Nitrogen.*—A green glow (with occasional blue flashes) from the solid surface at 4.2° K. The green glow persists for several minutes after the nitrogen supply and the discharge are off. Spectra of the radiation have been obtained with moderate dispersion. The glow is unaffected by pressure to 1 atm. but disappears suddenly at some temperature greater than 4.2° K. but less than 77° K.

While the discharge in region 1 is maintained, the walls of the collecting chamber 2 emit a strong green glow. This glow definitely originates from the inner surface where the deposition is occurring; this is verified by observing the interior of the chamber from above. Another characteristic of the surface glow is the random occurrence of local bright spots. After the discharge has been on for several minutes, brilliant flashes of blue appearance are observed spreading as much as two or three centimeters. These flashes are restricted to the surface (not volume effects within the chamber) and appear to be explosive reactions spreading within the deposited material. On one occasion, a sharp sound, as from an explosion, was heard at the same instant that intense blue flash was seen. Under some conditions the glow is a yellow-green rather than the usual more pure green.

After the discharge is extinguished and the flow of nitrogen is stopped, the green glow persists for more than five minutes. During this time the glow intensity diminishes steadily, with no spontaneous flashing. Admission of warm gas (nitrogen or helium) into collecting chamber 2 results in increased rate of disappearance and a blue glow before extinction. Removal of the entire apparatus from liquid helium bath 11 without adding warm gas has a similar result. Once, after the disappearance of both the green and blue glows, re-immersion of the chamber 2 into liquid helium bath 11 resulted in the reappearance of the green glow.

It is known that atoms can be pumped some distance from a discharge of the type used here and that atomic concentrations of several percent are easily obtainable. This, together with the facts reported above, lead to the conclusion that the cause of the glows, including the phosphorescence, is connected with the freezing out of free nitrogen atoms.

Spectra of the glows which have been observed have not yet been fully analyzed but it seems certain that the green bands are identical with those observed in 1924 by Vegard, Nature, 113, 716, and 114, 357, and McClennan and Shrum, Proceedings of the Royal Society, A106, 138. These observers found a green glow on bombarding solid nitrogen with electrons and "canal rays" from an electrical discharge. Phosphorescence and phenomena corresponding to the blue flashes were also observed. It should be pointed out that under the conditions of the present invention, i.e., with the major portion of the solid deposit collecting on the vertical walls of vessel 2, charged particles could not have come in a straight line from the discharge region to the glowing surface. In fact, the bottom of vessel 2 which was in direct line with the discharge, fluoresced with a violet color when the discharge was on. Since the present method relies on the freezing of products from an electrical discharge rather than a bombardment with charged particles, these results contribute to a fuller understanding of the actual mechanism involved.

(b) *Oxygen.*—The condensate of the oxygen products from the discharge is very difficult to observe except when the walls or part of the wall is not properly prepared. However, careful observation indicates a clear ice-like deposit. Upon warming, this deposit suddenly disappears and a white vapor cloud extends throughout the volume. The cloud disappears rapidly leaving the entire wall coated with a solid material with a violet color. With further heating the violet material melts, retaining its color. From the color, melting point, boiling point and the odor obtained at higher temperatures, this material has been identified as ozone.

Unless the surfaces are pre-treated with water, ozone is immediately deposited on the surface at the lowest temperatures. Films as thick as ½ mm. have been formed. These films are similar to a dried film of glyptal. Roughly, one liter of liquid helium is used to deposit one gram of ozone.

The apparatus is cleaned with a 10% solution of HF, rinsed several times with distilled water, and thoroughly dried. Within 15 to 30 seconds after the flow of oxygen through the discharge has been started, a violet coloration is observed on the walls of the vessel immersed in liquid helium. In 5 minutes a ½ mm. thick film of the colored material can be deposited. After several minutes the film begins to crack and to "peel" off the surface in sections as large as 1 by 5 cm.; these fall into the bottom of the vessel. The violet solid melts at a temperature above the melting point of oxygen (54° K.) and forms a deep blue-violet liquid which vaporizes at some temperature above the boiling point of nitrogen (77° K.) but below 273° K. The vapor has the pungent odor of ozone and quickly decomposes rubber. The color, odor, melting point, boiling point, and oxidizing action strongly indicate that the solid contains a large concentration of ozone. No crystals were observed, the deposit always appearing as an "amorphous" solid.

If a small amount of water vapor is admitted to the apparatus before the oxygen flow is started, the material deposited at 4.2° K. has completely different characteristics than those described above. A colorless, "amorphous" solid somewhat like a thin clear ice covers the inside of the vessel; small cracks develop after several minutes. In addition to the clear solid, a small ring of blue-violet solid deposits near the inlet to the cold chamber 2. With transmitted light, this ring of material is brown rather than clear or blue-violet.

When the temperature is raised to a point above 4.2° K. but less than 54° K., the transparent material disappears and a white cloud is seen in the volume. Within a few seconds the entire inner surface is coated with a purple solid, but the color density continues to increase for about 30 seconds. The material appears violet when observed with transmitted light. It liquifies above 54° K. and vaporizes considerably above 77° K. In this case, as before, it seems that a solid with a large concentration of ozone has been prepared.

One explanation of the deposit (which upon heating produces ozone) is that a solid containing free oxygen atoms has been deposited from the products of the discharge through oxygen. Such an explanation is consistent with the atomic concentration in the gas phase of similar discharges and with the formation of ozone.

(c) *Hydrogen.*—This condensate does not give any evidence of an active species but the solid formed from the products of the discharge is quite different from solid molecular hydrogen. In the former case a clear, viscous-looking solid is formed near the bottom of the collecting tube, while molecular hydrogen deposits higher in the collecting tube and appears more like snow.

(d) *Water.*—Two types of condensate are observed, which have tentatively been identified as a water and hydrogen peroxide; which is to be expected. In one group of experiments part of the original material which had been deposited at low temperaure disappeared at higher temperatures and the amount of peroxide increased.

(e) *Mixtures of nitrogen, oxygen and hydrogen.*—A brown condensate was observed which disappeared suddenly (like an explosion) at higher temperatures leaving only white, snow-like crystals. At room temperature a brown gas (similar to that of nitric acid) filled the entire apparatus.

The observations described provide conclusive evidence for the presence of atoms coexisting with molecules in the solid phase. Insofar as is known it is believed that the present invention is the first instance of the production in the solid phase of free radicals and of atoms of ordinarily diatomic molecules.

The present invention provides atomic elements in a solid state thus enabling them to be stored for long periods of time. Solid atomic hydrogen being the lightest of the atomic elements possesses many of the characteristics desired for use as a rocket fuel in that a recombination of atomic hydrogen into molecular hydrogen provides a maximum amount of chemical energy for a given weight of the atomic element.

Likewise the present invention can be utilized as a means for bringing about various chemical reactions. The breaking down of molecular gases of oxygen and hydrogen into their respective atomic elements, for example, illustrates that this invention provides a means for obtaining water from hydrogen and oxygen upon the combination of the atomic species of these elements as the temperature of the trap is subsequently increased. It is obvious that various other atomic elements could likewise be allowed to combine to form molecular compounds.

It will be apparent that the embodiments shown are only exemplary and that various modifications can be made in construction and arrangement within the scope of invention as defined in the appended claims.

What is claimed is:

1. A method of obtaining substantial concentrations of atoms and free radicals in combination with solid molecular gases comprising the steps of applying at ambient temperature an electric discharge to a gas subject to disassociation under the influence of said discharge and rapidly passing the products of said discharge to a temperature region of between 4 and 77° K.

2. A method of obtaining substantial concentrations of atoms and free radicals in combination with solid molecular gases comprising the steps of subjecting a gas capable of being disassociated by an electrical discharge to an electrical discharge at ambient temperature and causing the products of said discharge to be rapidly drawn into a low temperature region of between 4 and 77° K.

3. A method of obtaining substantial concentrations of atoms and free radicals in combination with solid molecular gases comprising the steps of applying an electrical discharge to a gas at ambient temperature and at a pressure of from 0.1 to 10 mm. Hg, said gas being subject to disassociation under the influence of said discharge, and causing the products of said discharge to be rapidly drawn into a low temperature region of between 4 and 77° K.

4. A method of obtaining substantial concentrations of atoms and free radicals in combination with solid molecular gases comprising the steps of applying a high frequency electrical discharge to a gas at ambient temperature and at a pressure of from 0.1 to 10 mm. Hg, said gas being subject to disassociation under the influence of said discharge, and rapidly pumping the products of said discharge into a low temperature trap surrounded by liquid helium.

5. A method of obtaining substantial concentrations of atoms and free radicals in combination with solid molecular gases comprising the steps of applying a microwave electrodeless electrical discharge to a gas at ambient temperature and at a pressure of from 0.1 to 10 mm. Hg, said gas being subject to disassociation under the influence of said discharge, and allowing the products of said discharge to be rapidly drawn into a low temperature trap at liquid helium temperature.

6. A method of obtaining substantial concentrations of atomic species in combination with solid diatomic molecular gases of the group consisting of nitrogen, oxygen, and hydrogen comprising the steps of applying a microwave electrodeless electrical discharge to one of said gases at ambient temperature and at a pressure of from 0.1 to 10 mm. Hg and allowing the products of said discharge to be rapidly drawn into a low temperature trap at liquid helium temperature.

7. The method as defined in claim 6 in which said gas is nitrogen.

8. The method as defined in claim 6 in which said gas is oxygen.

9. The method as defined in claim 6 in which said gas is hydrogen.

10. A method of obtaining substantial concentrations of the free hydroxyl radical in combination with solid water comprising the steps of applying a microwave electrodeless electrical discharge to gaseous water at ambient temperature and at a pressure of from 0.1 to 10 mm. Hg and allowing the products of said discharge to be rapidly drawn into a low temperature trap at liquid helium temperature.

References Cited in the file of this patent
UNITED STATES PATENTS

| | | |
|---|---|---|
| 2,704,274 | Allison | Mar. 15, 1955 |
| 2,732,338 | Moody | Jan. 24, 1956 |

OTHER REFERENCES

Proceedings of the Royal Society (II), A 101, pp. 116–121, 123.

The Electrochemistry of Gases and Other Dielectrics, by G. Glockler and S. C. Lind, John Wiley & Sons, New York, N.Y. (1939), p. 211.

Journal of Inst. Electrical Eng. (London), vol. 94, part III (January 1947), pp. 27, 29, 30, 31, 32, 34.

Nature, 113, pp. 716, 717.

Nature, 114, pp. 357 to 359.

Proceedings of the Royal Society, A 106, pp. 138–149.

Transactions of the Faraday Society, vol. 23 (1927), pp. 60, 61.

Proceedings of the Physical Society, London, vol. 40 (1927–1928), pp. 79, 88, 89.